United States Patent

[11] 3,610,571

| [72] | Inventor | Richard L. Cisco<br>Torrance, Calif. |
| [21] | Appl. No. | 828,132 |
| [22] | Filed | May 27, 1969 |
| [45] | Patented | Oct. 5, 1971 |
| [73] | Assignee | Parker-Hannifin Corporation<br>Cleveland, Ohio |

[54] CONTROL VALVE ASSEMBLY
7 Claims, 2 Drawing Figs.

[52] U.S. Cl. .................................................. 251/63.6,
251/43, 251/144
[51] Int. Cl. ...................................................... F16k 31/12
[50] Field of Search.......................................... 91/216;-
92/107-109, 117; 137/389, 391, 413, 414, 415;
141/198; 251/12, 43, 62, 63, 144, 25, 63.4-63.6

[56] References Cited
UNITED STATES PATENTS

| 2,049,997 | 8/1936 | Eaton .......................... | 251/144 X |
| 2,475,040 | 7/1949 | Mandl ......................... | 92/107 X |
| 3,125,320 | 3/1964 | DeFrees ...................... | 251/144 X |
| 3,240,224 | 3/1966 | Horl et al. .................... | 251/144 X |
| 3,257,093 | 6/1966 | DeFrees ...................... | 251/144 X |
| 3,406,709 | 10/1968 | Elbogen et al. ............... | 137/413 X |
| 3,415,486 | 12/1968 | DeFrees ...................... | 251/144 X |

Primary Examiner—Laverne D. Geiger
Assistant Examiner—Edward J. Earls
Attorney—Diller, Brown, Ramik & Holt ABSTRACT: This disclosure relates to a valve for tank filling and draining. The valve is adapted to be disposed in the bottom of a tank and includes a housing and a valve seat. A main valve member is biased against the seat and may be opened by actuating means including a piston fixed relative to the housing and a cylinder movable relative thereto. The cylinder overlies the piston and thus protects it from sediment settling in the tank.

PATENTED OCT 5 1971 3,610,571

INVENTOR
RICHARD L. CISCO
BY Diller, Brown, Ramik & Hals
ATTORNEYS

CONTROL VALVE ASSEMBLY

This invention relates particularly to a valve for bottom loading and off-loading of tanks.

Valves of the aforementioned type are disposed in the bottoms of tanks and are thus submerged in fluid contained within the tanks. Prior valves have been adversely affected by sediment from such liquids. It is, therefore, an object of this invention to provide a valve having novel features of construction which protect critical parts thereof from sedimentary deposits.

Heretofore, such valves have included a fluid-pressure-operated piston and cylinder assembly for moving a main valve member of the valve away from its seat with the cylinder being exposed to settling sediment thereby affecting movement of the piston. It is, therefore, more particularly an object of this invention to provide a valve including a piston and cylinder assembly wherein the cylinder overlies the piston thereby providing a cover shielding the piston from settling sediment.

With the above and other objects in view that will hereinafter appear, the nature of the invention will be more clearly understood by reference to the following detailed description, the appended claimed subject matter and the several views illustrated in the accompanying drawing.

IN THE DRAWING

Figure 1:
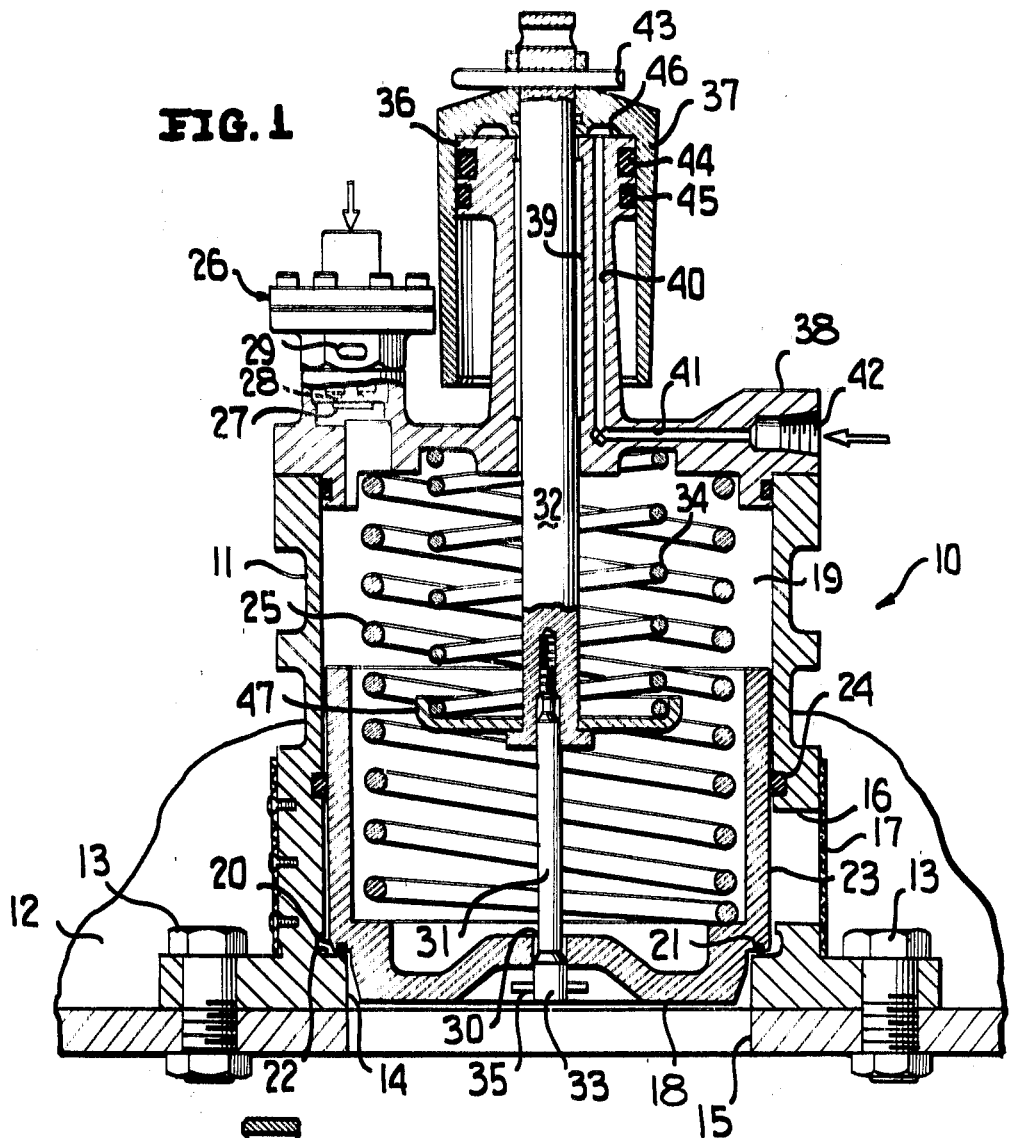
FIG. 1 is an axial sectional view taken through the valve with parts thereof shown in side elevation.

Valve 10 of FIG. 1 includes housing 11 secured in tank 12 by bolts 13. Housing 11 includes inlet 14 aligned with opening 15 of tank 12, and outlet 16 in a side thereof protected by screen 17. Main valve member 18 simultaneously closes off inlet 14 and outlet 16 from the interior of housing 11 which defines chamber 19. Main valve member 18 includes annular portion 20 having sealing ring 21 set therein for seating against seat 22 to close inlet 14. Outlet 16 is closed by cylindrical portion 23 of main valve member 18 and sealing ring 24. When tank 12 is being off-loaded, flow through housing 11 is reversed.

To fill tank 12, a supply conduit is connected to opening 15. However, because of the combined force applied against the interior of main valve member 18 by spring 25 and static pressure existing in chamber 19, the pressure of the supply fluid will be insufficient to move main valve member 18 off seat 22. Thus a pressure signal (such as inlet pressure delivered through a pilot line) is transmitted to pilot valve assembly 26 for partially venting chamber 19 to the interior of tank 12. This is accomplished by the signal causing valve head 27 to move away from its seat 28 thereby creating a bleed passage terminating in port 29. As static pressure in chamber 19 is thus reduced, main valve member 18 will begin to move off seat 22. As this occurs, supply fluid enters chamber 19 through an annular orifice between bore 30 in main valve member 18 and rod portion 31 of plunger 32. However, since flow capacity through the bleed passage of pilot valve assembly 26 is greater than the flow capacity through the restricted bore 30, fluid escapes from chamber 19 more rapidly than it enters and main valve member 18 will remain open permitting supply fluid to enter tank 12 through opening 16.

When the signal activating pilot valve assembly 26 terminates (which occurs automatically when fluid level in tank 12 reaches a predetermined level) valve head 27 will seat closing the bleed passage and permitting the static pressure in chamber 19 to build up to close main valve member 18. Just before main valve member 18 seats bore 30 will be gradually closed by enlarged head 33 of rod 31 thereby having its final closing movement cushioned.

When tank 12 is off-loaded main valve member 18 is opened by plunger 32 moving upward against the force of spring 23 through pin 35 engaging the underside of main valve member 18.

Plunger 32 is moved upward by cooperating piston 36 and inverted cup-shaped cylinder 37. Piston 36 is part of cover 38 of housing 11 and includes a central bore 39 and generally vertical passage 40 communicating with horizontal passage 41 in cover 38. Threaded socket 42 is provided in cover 38 for receiving a fitting of a pressurized fluid conduit.

Cylinder 37 is secured to plunger 32 by pin 43. Suitable sealing rings 44, 45 are provided in grooves in the periphery of piston 36 to provide a fluidtight sliding seal with cylinder 37. Cylinder 37 thus provides a cap or cover that shields piston 36 from sediment settling to the bottom of tank 12.

Actuation of plunger 32 to open main valve member 18 is effected by delivering fluid under pressure through passages 41, 40 to the end 46 of piston 36 with cylinder 37 rising against the biasing force of spring 34 disposed in chamber 19 between cover 38 and retainer 47 carried by plunger 32. Main valve member 18 is pulled upward by pin 35 unblocking inlet 14 and outlet 16 and permitting off-loading of tank 12.

Figure 2:
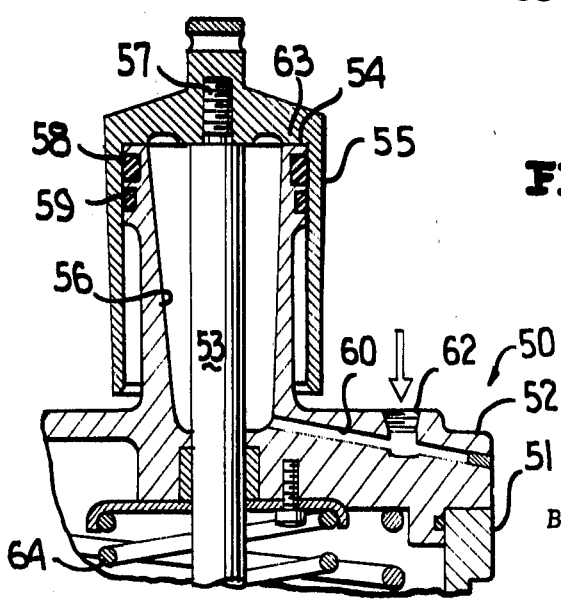
FIG. 2 is a fragmentary axial sectional view taken through the upper portion of another embodiment of the valve.

Valve 50 illustrated in FIG. 2 is similar to valve 10 and includes housing 51 having cover 52. Plunger 53 is disposed within housing 51 and actuatable by cooperating piston 54 and inverted cup-shaped cylinder 55. Piston 54 is part of cover 52 and includes a longitudinal flaring bore 56 formed therethrough. Plunger 53 extends through bore 56 and includes threaded end 57 secured to cylinder 55. Suitable sealing rings 58, 59 disposed in grooves in the periphery of piston 54 provide sliding seals with cylinder 55.

Bore 60 is formed through cover 52 and communicates with bore 56.

When it is desired to open valve 50, fluid under pressure is delivered through internally threaded socket 62 in cover 52 and delivered to end 63 of piston 54 through communicating bores 60, 56. Cylinder 55 is forced upward against the force of spring 64 to open valve 50.

Valve 50 differs from valve 10 in that bore 56 in piston 54 serves the dual function of accommodating plunger 53 and providing a passage for the actuating fluid whereas valve 10 includes the auxiliary passage 40 for the actuating fluid. However, valve 50 incorporates the advantageous protective cylinder arrangement.

From the foregoing, it will be readily apparent that there is provided in accordance with this invention a novel valve which may be opened by fluid-pressure-actuated cooperating piston and cylinder, and wherein the piston is fixed and the cylinder is disposed over the piston in inverted cuplike fashion as a cover shielding the piston from sediment settling to the bottom of the tank.

I claim:

1. A valve adapted to be positioned in a fluid-containing tank, said valve comprising a main valve member, actuating means coupled to said main valve member for moving said main valve member, said actuating means including relatively movable elements having opposed relatively movable surfaces freely exposed to fluid in the tank, and means for shielding said surfaces from sediment falling therepast, a housing having a passage therethrough and a valve seat, said main valve member movable in said housing into and out of engagement with said seat, said elements including a piston fixed relative to said housing and a cylinder movable relative thereto, a plunger carried by said cylinder and engageable with said main valve member, and means for supplying fluid to one end of said piston for moving said cylinder thereby moving said main valve member away from said seat.

2. The valve of claim 1 wherein said means for supplying fluid includes a passage extending through said piston.

3. The valve of claim 2 wherein said piston has an axial bore formed therethrough, said plunger extends through said bore, and said passage communicates with the end of said piston through said bore.

4. The valve of claim 1 including means for equalizing fluid pressure on inlet and outlet sides of said main valve member, means providing a force sufficient to bias said main valve member against said seat when the fluid pressure is equalized, and means responsive to a predetermined signal for reducing the fluid pressure on the outlet side of said main valve member whereby the fluid pressure on the inlet side will be sufficient to overcome said biasing force to move said main valve member away from said seat.

5. The valve of claim 4 wherein said equalizing means is a bore formed in said main valve member.

6. The valve of claim 4 wherein said signal responsive means is a pilot valve assembly having a valve head normally biased closed against a valve seat, and a bleed passage communicating with the outlet side of said main valve member upon movement of said valve head away from its seat as a result of fluid pressure applied in response to said signal.

7. The valve of claim 6 wherein the flow capacity of said bleed passage is greater than the flow capacity of said equalizing means.